United States Patent [19]
Weischedel et al.

[11] 3,870,943
[45] Mar. 11, 1975

[54] CONVERTER CIRCUIT WITH CORRECTION CIRCUITRY TO MAINTAIN SIGNAL SYMMETRY IN THE SWITCHING DEVICES

[75] Inventors: Herbert Rudolf Weischedel, Rockaway; George Raymond Westerman, Denville, both of N.J.

[73] Assignee: Bell Telephone Laboratories, Incorporated, Murray Hill, N.J.

[22] Filed: Dec. 20, 1973

[21] Appl. No.: 426,518

Related U.S. Application Data
[63] Continuation-in-part of Ser. No. 281,436, Aug. 17, 1972, abandoned.

[52] U.S. Cl. ................................ 321/2, 321/13
[51] Int. Cl. ........................................ H02m 1/18
[58] Field of Search .............. 321/2, 11, 12, 13, 18, 321/19, 45 R; 330/123, 119; 323/20

[56] References Cited
UNITED STATES PATENTS

| | | | |
|---|---|---|---|
| 2,921,266 | 1/1960 | Kiebert | 330/119 |
| 3,439,251 | 4/1969 | Schaefer | 321/2 |
| 3,490,028 | 1/1970 | Modiano | 321/45 R |
| 3,539,905 | 11/1970 | Schwarz | 321/45 R |
| 3,601,680 | 8/1971 | Beckwith | 321/2 |
| 3,657,631 | 4/1972 | Martens | 321/18 |
| 3,710,229 | 1/1973 | Jessee | 321/45 R |
| 3,733,537 | 5/1973 | Kernick et al. | 321/13 |
| 3,737,756 | 6/1973 | Hasley et al. | 321/2 |

*Primary Examiner*—William H. Beha, Jr.
*Attorney, Agent, or Firm*—A. G. Steinmetz

[57] ABSTRACT

A DC to DC converter regulated by pulse width modulation techniques includes correction circuitry to maintain balanced current conduction in the converter switching devices. The correction circuitry monitors the current conduction in each switching device and varies the duty cycle thereof to restore the current balance if a current unbalance therein is detected.

9 Claims, 3 Drawing Figures

3,870,943

3,870,943

CONVERTER CIRCUIT WITH CORRECTION CIRCUITRY TO MAINTAIN SIGNAL SYMMETRY IN THE SWITCHING DEVICES

CROSS REFERENCE TO RELATED APPLICATION

This application is a continuation-in-part of our co-pending application, Ser. No. 281,436, filed Aug. 17, 1972, now abandoned.

BACKGROUND OF THE DISCLOSURE

This invention relates to converter circuits and more particularly to transformer coupled double-ended converter circuits. It is specifically concerned with symmetrical conduction in the switching devices of a double-ended converter circuit.

Transformer coupled double-ended converter circuits comprise two switching devices which are alternately and periodically turned ON and OFF. These switching devices are coupled to the opposite terminals of the primary winding of a power transformer. The switching of these devices alternately couples a DC energy source to the opposite terminals of the primary winding and generates an AC square wave signal therein.

The most commonly used switching devices in converter circuits are switching transistors. If the characteristics of these transistors are not ideally matched, the alternate signal conducted by the transistors are not equal in magnitude and/or duration. The characteristic parameters responsible for this unbalance include transistor parameters such as the saturation voltage level, the charge storage time, and the delay time of the transistor. If the parameter described are different, the voltage time area applied to the alternate terminals of the primary of the power transformer differs during each half cycle. A DC voltage component is therefore established across the primary winding and the transformer core is rapidly driven into saturation. This saturation induces excessive peak currents in the switching transistors which may cause severe damage to the switching transistors.

In the prior art these difficulties have been overcome by carefully matching the transistor characteristics of the alternately switched transistors or by using transistors having a sufficient signal capacity to tolerate the high currents generated by saturation of the transformer core. Other techniques have included inserting an inductor into the main current path of the switching transistors to inhibit rapid current rises due to the saturation of the transformer. The careful matching of characteristics is very expensive if the production of large numbers of converters is contemplated. The latter solution adversely affects the efficiency of operation of the converter circuit.

It is, therefore, an object of the invention to balance the currents flowing through the alternately switched switching devices of a converter circuit irrespective of differences in the characteristics of the switching devices.

It is also an object of the invention to balance the current flow in the alternately switched switching devices of a converter circuit with a minimum of circuit complexity and without decreasing the efficiency of operation of the converter.

SUMMARY OF THE INVENTION

Therefore, in accord with the invention, a DC to DC converter includes a symmetry correction scheme to compensate for parameter dissymmetries in the two switching devices in a pulse width modulated doubled-ended converter. The circuitry to effect the symmetry correction monitors the current output of each of the converter switching devices and derives a signal proportional to the dissymmetry. This signal is utilized to individually control the pulse width modulation of each switching device in order to maintain the symmetry of conduction therein.

BRIEF DESCRIPTION OF THE DRAWINGS

Many additional objects, features, and advantages will be apparent from the following detailed description and the accompanying drawings, in which.

DETAILED DESCRIPTION

Figure 1:
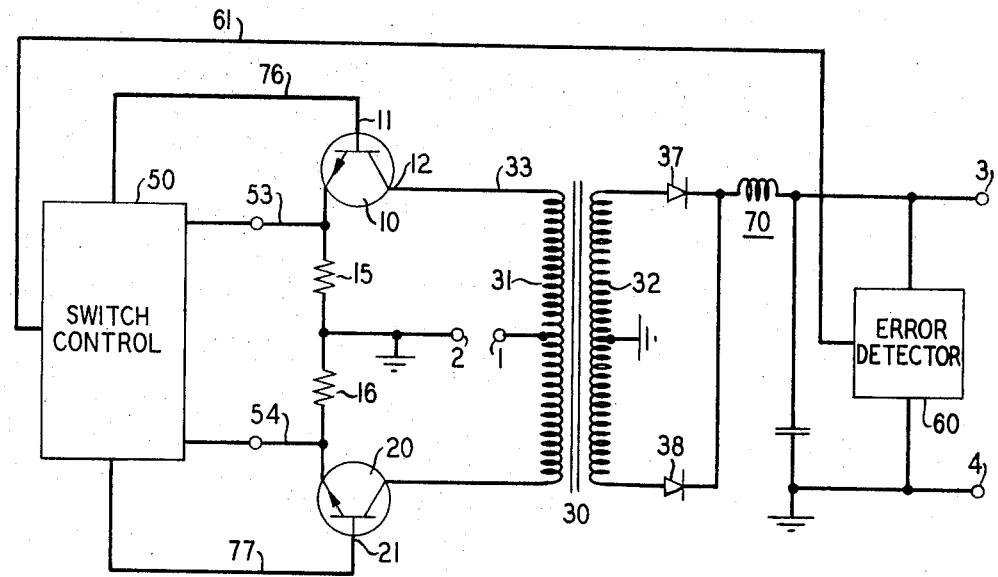
FIG. 1 is a schematic diagram of pulse width modulated DC to DC converter according to the principles of the invention.

The DC to DC converter shown in FIG. 1 converts a DC voltage supplied by a DC source to a DC voltage at another voltage level. A DC voltage is applied to the input terminals 1 and 2. The two switching transistors 10 and 20 are alternately switched to generate a square wave signal in the primary winding 31 of the power transformer 30. The transformer 30 changes the voltage level by transformer action from one level to another level. The signal output of the secondary winding 32 is rectified by the diodes 37 and 38 and transmitted, via the output filter 70, to the output terminals 3 and 4.

Figure 2:
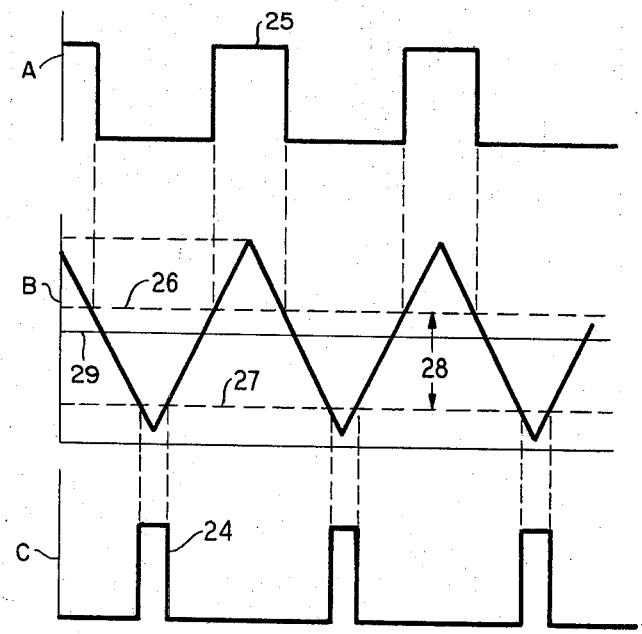
FIG. 2 illustrates voltage waveforms to assist in explaining the operation of FIG. 1.

The switching of the transistors 10 and 20 is controlled by the switching control 50. The switching control 50 generates a triangular wave, the opposite phases of which are applied to oppositely phased threshold responsive circuits not shown but included in the switching control 50. When the triangular wave exceeds a threshold, a pulse signal is generated, which is applied via leads 76 and 77, to drive the switching transistors 10 and 20, respectively. The triangular wave generated by the signal control 50 and applied to the internal threshold responsive circuits is shown by waveform B in FIG. 2. The triangular waveform B is symmetrical about a controlled DC voltage level 29. The oppositely phased internal threshold responsive circuits are responsive to the threshold levels 26 and 27, respectively. When the triangular waveform B exceeds the threshold level 26 as shown in FIG. 2 in a positive-going direction, the internal threshold responsive circuit connected to lead 76 is activated and a pulse signal 25 is applied to the base 11 of transistor 10 to bias it conducting. When the triangular waveform B exceeds the threshold 27 in a negative-going direction, the internal threshold responsive circuit connected to lead 77 is activated and a pulse signal 24 is applied to the base 21 of transistor 20 to bias it conducting.

For illustrative purposes the pulse signals 25 and 24 have been shown to be unequal. This inequality is in response to the symmetry monitoring action of the switch control 50. The two monitoring resistors 15 and 16 are included in the current paths of the switching transistors 10 and 20, respectively. The respective voltages generated across these resistors 15 and 16 are coupled to the switching control 50, via leads 53 and 54. These voltages are utilized to control the average DC voltage level 29 of the triangular waveform B. By modifying the voltage level 29 the duty cycle of the two switching transistors 10 and 20 may be modified in a complementary fashion to restore symmetry of conduction therein. If as shown in FIG. 2 the average DC voltage level 29 is high, the portion of the triangular waveform B exceeding the threshold level 26 is larger than the portion of the triangular waveform B exceeding the threshold level 27, and hence the duty cycle of switching transistor 10 will exceed the duty cycle of switching transistor 20.

The converter circuit also includes an error detector circuit 60 which is utilized to monitor the output voltage across the output terminals 3 and 4. The error detector 60 generates a feedback signal proportional to the difference between the output voltage and a reference voltage. The error signal generated is coupled, via lead 61, to the switching control 50. This error signal is utilized to control the voltage magnitude difference 28 shown in FIG. 2 between the upper and lower switching thresholds 26 and 27. This voltage difference 28 between thresholds is varied in order to regulate the output voltage of the converter. This voltage difference 28 determines the total combined duty cycle of the switching transistors 10 and 20 during each cycle of operation.

It is apparent from the foregoing that, if an imbalance in conduction occurs between the switching transistors 10 and 20, the DC level of the triangular drive waveform is shifted unsymmetrically with respect to the switching thresholds in a direction to restore signal symmetry in the switching transistors 10 and 20.

Figure 3:
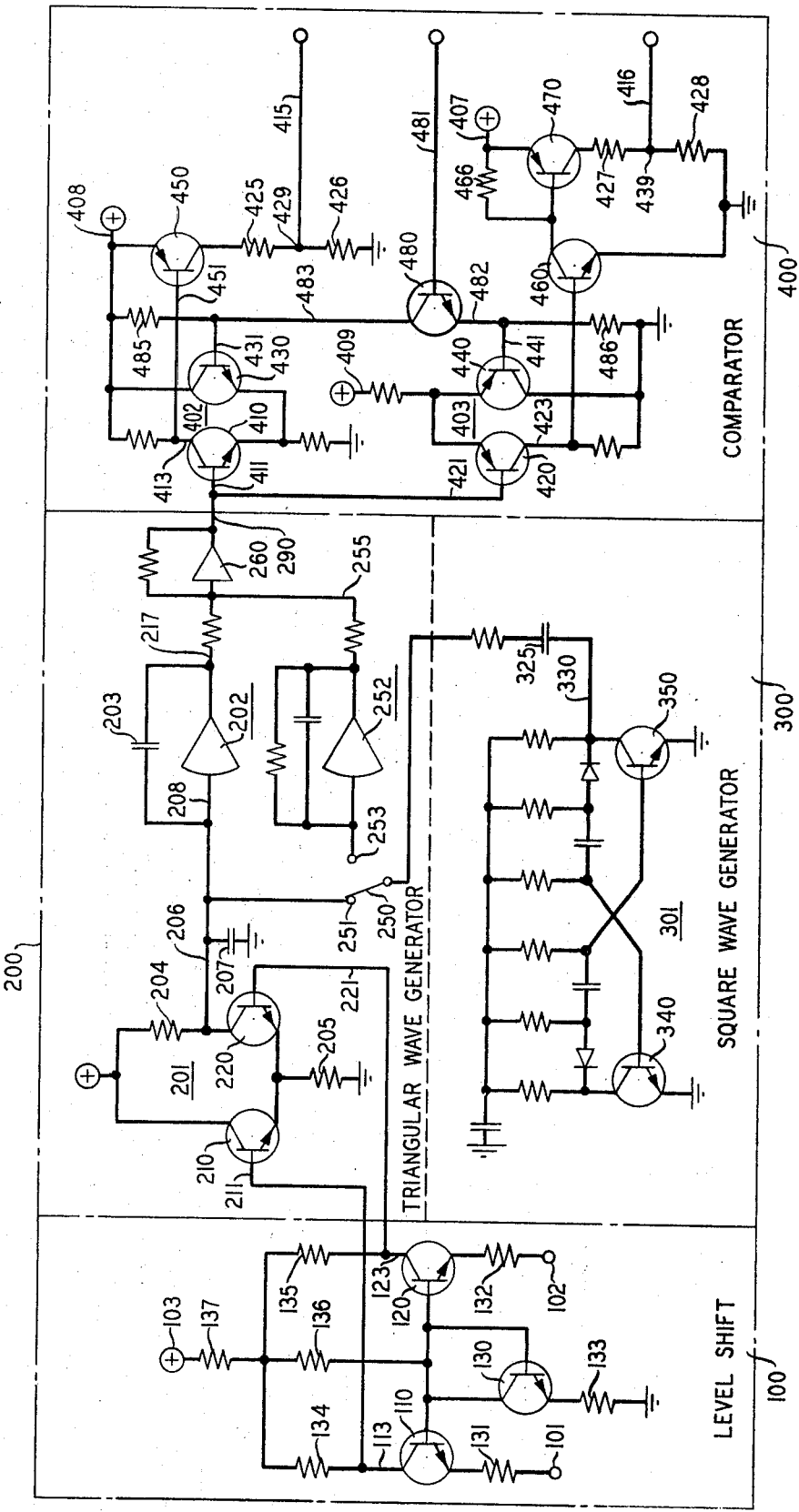
FIG. 3 is a schematic of the pulse width modulation and symmetry correction circuitry used in the DC to DC converter circuit shown in FIG. 1.

The switching control circuit 50, shown in detail in FIG. 3, comprises a level shifter circuit 100, a triangular wave generator 200, a square wave generator 300, and a comparator circuit 400. The level shifter 100 shifts the current monitoring feedback signals to achieve a suitable voltage input to the triangular wave generator 200. The triangular wave generator 200 measures the differences between the two current monitoring signals. This difference signal is combined within the triangular wave generator 200 with the basic square wave drive signal supplied by the square wave generator 300 to produce a triangular wave signal with a controlled DC average signal level proportional to the difference signal.

The triangular wave generator 200 includes two operational amplifier integrators 202 and 252. The output of the square wave generator 300 may be applied to either integrator 202 or 252 by changing the connection position of a switch 250. This switching arrangement permits the combined integration of the difference signal and the square wave signal or individual integration of the two aforesaid signals. In the combined integration technique, the shape of the triangular wave is a function of the magnitude of square wave input and the magnitude of the difference signal. In some instances of large difference signals, the combined integration may produce a distorted triangular wave output and it becomes more desirable to separately integrate the two signals. In both arrangements the output of the triangular wave generator 200 is a triangular wave signal superimposed upon a controllable DC average voltage level. This triangular wave signal is applied to the comparator circuit 400. The comparator circuit 400 establishes an upper and lower threshold level and generates a pulse signal whenever the triangular wave signal exceeds one of these thresholds. These threshold levels are controlled in response to the signal feedback of the error detector 60 shown in FIG. 1. The modified drive signal is utilized to drive the switching transistors 10 and 20 shown in FIG. 1.

The voltages proportional to the current flowing through the current monitoring resistors 15 and 16, as shown in FIG. 1, are applied to the input terminals 101 and 102 of the level shifter 100. The level shifter 100 comprises two DC energized voltage dividers each having one variable voltage input terminal 101 and 102, respectively, to which a feedback current monitoring signal is applied. The level shifter 100 is energized by a DC source connected to the source terminal 103. The source terminal 103 is coupled by a first-voltage divider path comprising the resistors 134 and 131 and the transistor 110 to the input terminal 101. A second voltage divider path comprising the resistor 135, the transistor 120 and the resistor 132 couples the DC energized source terminal 103 to the input terminal 102. The transistors 110 and 120 are biased into a conducting state by the DC signal passing through the transistor connected diode device 130 and the resistors 137, 136, and 133 to ground. The collector voltages of the transistors 110 and 120 are approximately equal to the reference voltage level 29 as shown in FIG. 2. The current monitoring signals applied to terminals 101 and 102 modifies the average DC signal level of the triangular wave signal output of the triangular wave generator 200 in accordance with the monitored current conduction responsive signal output of transistors 10 and 20, respectively. This average DC signal level is modified in order to restore the symmetry of conduction in the converter's switching transistors 10 and 20. This average DC signal level is approximately one-half the magnitude of the DC voltage source applied to the source terminal 103.

The collectors 113 and 123 of transistors 110 and 120 are connected to the inputs 211 and 221 of the triangular wave generator 200. The triangular wave generator 200 comprises a differential amplifier 201, a first operational integrator 202, a second operational integrator 252, and an operational summing amplifier 260. The output of the level shifter at the collectors 113 and 123 comprises phase displaced pulse signals responsive to the alternate conduction of the converter switching transistors. These phase displaced signals are coupled to drive the paired transistors 210 and 220, respectively, of the differential amplifier 201 included in the triangular wave generator 200. The output voltage of the differential amplifier 201 appearing across its load resistor 204 is coupled, via lead 206, to a charge storage capacitor 207.

It is apparent from the foregoing description that the output signal stored in the charge storage capacitor 207 is directly proportional to differences in the current conducted through the resistors 15 and 16 shown in FIG. 1. This difference signal is applied to the input 208 of an operational integrator 202.

A square wave drive signal is applied to the triangular wave generator 200. This square wave signal is generated by a square wave generator 300. The square wave generator 300 comprises an astable multivibrator circuit including two cross-coupled transistors 340 and 350. The alternate switching of transistors 340 and 350 produces a square wave signal at the output terminal 330.

The square wave signal is applied via the DC blocking capacitor 325 to the switch 250 of the triangular wave generator 200. When the switch armature is connected to contact 251 the operational integrator 202 integrates both the symmetry control signal and the drive signal, applied via input lead 208, to produce the triangular wave drive signal on output lead 217. The triangular wave signal has a controlled average DC signal level 29 proportional to the symmetry control signal as shown by waveform B in FIG. 2. The symmetry control signal produced by the differential amplifier 201 modifies the average DC signal level 29 of the triangular waveform B to maintain the symmetry of conduction in the converter switching transistors 10 and 20.

The output of the operational integrator 202 is applied, via lead 217, to a summing amplifier 260. The summing amplifier 260 is utilized to sum the outputs of the integrators 202 and 252 in an alternate mode of operation described below. The output of the summing amplifier 260 is applied, via lead 290, to the input terminal 411 of the comparator circuit 400.

In the operation of the triangular wave generator as described above, the symmetry control signal and the square wave are integrated in a common operational integrator 202. If the difference signal output of the differential amplifier 201 is relatively large with respect to the square wave signal generated by the square wave generator 300, the filter capacitor 203 of the operational integrator 202 may be too small to completely filter the input signal. The capacitor is normally selected to give a triangular wave output for a particular square wave input. In the case of large difference signals the triangular wave shape may be adversely distorted causing erratic operation of the converter. In situations where a large difference signal may occur, the triangular wave may be generated separately by using a separate operational integrator to generate the triangular wave which is then summed with the integrated difference signal. In this situation the armature of switch 250 is connected to contact 253. A triangular wave is derived by the operational integrator 252 from the square wave input at contact 253. This triangular wave is applied, via lead 255, to the summing amplifier 260 where it is superimposed on the integrated DC difference signal output of the operational amplifier 202. The shape of this triangular wave is independent of the magnitude of the difference signal and its average DC signal level is related only to the conduction dissymmetry in the converter's switching device. The output of the summing amplifier is applied as before to the input terminal 401 of the comparator circuit 400.

The comparator circuit 400 comprises two differential amplifiers 402 and 403 utilizing opposite conductivity type transistors. Each of the differential amplifiers 402 and 403 is energized by the same DC voltage source connected to the source terminals 408 and 409, respectively. The state of the differential amplifier 402 establishes the upper switching threshold 26 and the state of the differential amplifier 403 establishes the lower switching threshold 27 as shown in FIG. 2. The base lead input 431 of the differential amplifier 402 is connected to the collector 483 of the transistor 480 and the base lead input 441 of the differential amplifier 403 is connected to the emitter 482 of the transistor 480. The base of transistor 480 is coupled to receive an error correction signal for voltage regulation purposes from the error detector circuit 60 as shown in FIG. 1.

The operation of the comparator 400 may be best understood by describing its response to an error correction signal. An energizing DC voltage source is connected to the source terminal 408 the resistor 485, the collector emitter path of the transistor 480, and the resistor 486 to ground. The error voltage at the base 481 of transistor 480 determines the voltage at the emitter 482 and thus the voltage drop across resistor 486. Since resistors 485 and 486 are equal and since the currents through them are approximately equal, the voltage drop across these resistors will be approximately the same. Thus, the voltage at the emitter 482 of transistor 480 will be displaced up from ground essentially with the same magnitude as the voltage at the collector 483 is displaced down from the DC energizing voltage applied to the source terminal 408. The voltages at the collector 483 and the emitter 482 of transistor 480 set the switching thresholds 26 and 27, respectively, as shown in FIG. 2.

The voltage level at the emitter 482 is applied to the base 441 of transistor 440. The voltage level at the collector 483 is applied to the base 431 of transistor 430. The triangular voltage waveform output of triangular wave generator 200 is applied simultaneously via lead 290 to the base leads 411 and 421 of the transistors 410 and 420, respectively. The voltage signal level applied to the base 431 of transistor 430 determines the upper threshold level at which the transistor 410 is biased into conduction. As the triangular waveform drive signal increases in magnitude, the transistor 410 is biased into conduction when the voltage level applied to the base 411 exceeds the voltage level applied to the base 431 of transistor 430.

When transistor 410 is biased into conduction, its collector voltage at collector 413 is applied to the base 451 of transistor 450. This collector voltage drives the transistor 450 into saturation. The saturated transistor 450 couples the DC voltage applied to the source terminal 408 to the voltage divider comprising the resistors 425 and 426. The voltage at the junction 429 of resistors 425 and 426 is applied, via lead 415, to drive one of the switching transistors of the converter circuit.

The alternately switched switching transistor is driven by a pulse signal supplied via the lead 416. During this period the triangular waveform output of the integrator applied to base 421 of transistor 420 decreases in magnitude. When the magnitude of the triangular waveform B is less than the voltage applied to the base 441, shown by level 27 in FIG. 2, the transistor 420 is biased into conduction. The voltage at the collector 423 of transistor 420 is coupled to and biases the transistor 460 into conduction. The current flow therethrough biases the transistor 470 into conduction. Transistor 470 is connected in series with the DC voltage source coupled to the source terminal 407 and the resistors 427 and 428. The voltage at the junction 439 of resistors 427 and 428 is coupled, via lead 416, to drive the alternately switched switching transistor of the converter.

As is apparent from the foregoing description, the output of the differential amplifier 201 is applied to the operational integrator 202 and shifts the DC level of the triangular wave derived from the square wave generator 300 in such a way as to restore symmetry of conduction in the converter switching devices should dissymmetry occur. The triangular wave from the integrator is applied to a comparator which establishes the switching thresholds of the alternately switched switching transistors of the converter in response to an error signal to achieve voltage regulation of the converter output.

What is claimed is;

1. Symmetry correction circuitry to balance the signals in the two switching devices in a DC to DC converter comprising, means to monitor the individual signals in the first and second switching devices, differential amplifier means responsive to said means to monitor to generate a signal responsive to the difference in signals conducted by the first and second switching devices, square wave generating means to generate periodic square wave signals, wherein the improvement comprises integration means to integrate the outputs of said differential amplifier means and said square wave generating means, and comparator means coupled to the output of said integration means and having an upper and lower threshold, said comparator means responding to the integrated output of the integration means by generating a drive signal when the output signal of said integration means exceeds the upper and lower threshold, whereby the drive signal is used to switch the two switching devices.

2. Symmetry correction circuitry as defined in claim 1 wherein said comparator means includes a second and third differential amplifier means each having first and second input means and an output means, first and second voltage threshold means to establish a first and second voltage threshold, said first voltage threshold means coupled to the first input means of said second differential amplifier means, said second voltage threshold means coupled to the first input means of said third differential amplifier means, said integration means having its output coupled to the second input means of said second and third differential amplifier means, the output of said second and third differential amplifier means being coupled to drive the two switching devices of said DC to DC converter.

3. Symmetry correction circuit as defined in claim 2 wherein said first and second voltage threshold means includes a first resistor, a transistor and a second resistor, said first resistor, the collector emitter path of said transistor, and said second resistor being connected in series in that order, the junction of said first resistor and said transistor being connected to the first input means of said second differential amplifier, the junction of said second resistor and said transistor being connected to the first input means of said third differential amplifier, and voltage regulation means to supply an error voltage to the base of said transistor.

4. A symmetry correction circuit to balance conduction in first and second switching devices in a DC to DC converter including a signal output regulator feedback circuit, said correction circuit comprising, first and second means to monitor the individual current load in said first and second switching devices, amplifier means responsive to said means to monitor to generate signals responsive to the individual current load in the first and second switching devices, a square wave generating means to generate periodic square waves, means to integrate the output of said amplifier means and said square wave generator, means to utilize the output of said means to integrate to drive said first and second switching devices including means to establish an upper voltage threshold, means to establish a lower voltage threshold, first means to compare the output of said means to integrate with said upper voltage threshold, second means to compare the output of said means to integrate with said lower voltage threshold, and means responsive to said first and second means to compare to generate signals to drive the first and second switching devices.

5. A symmetry correction circuit as defined in claim 4 wherein said means to establish an upper and lower voltage threshold includes a source of voltage, a first impedance, a transistor, a second impedance, and a reference ground all connected in series, said first means to compare comprising a first differential amplifier having a first reference input connected to a junction of said first impedance and said first transistor, and said second means to compare comprising a second differential amplifier having a second reference input connected to a junction of said second impedance and said first transistor, the output of said means to integrate being applied in parallel to said first and second differential amplifiers, whereby the differential amplifiers are activated to generate an output signal when its input exceeds a voltage threshold applied to its respective reference input.

6. Symmetry correction circuitry to balance the signals in alternately switched first and second switching devices comprising, first and second sensing means in series with each of said first and second switching devices, respectively, to individually monitor the signals in said switching devices, differential amplifier means responsive to said first and second sensing means to generate a difference signal proportional to the difference in signals conducted by the first and second switching devices, means to generate a first periodic signal, means to integrate said difference signals and said first periodic signal and means to derive therefrom a second periodic signal wherein the average signal level of said second periodic signal is responsive to said difference signal, and comparator means coupled to receive said second periodic signal and having an upper and lower threshold, said comparator means responding to said second periodic signal by generating a drive signal when the second periodic signal exceeds said upper and lower thresholds, whereby the drive signal is utilized to control the switching of said first and second switching devices.

7. Symmetry correction circuitry as defined in claim 6 wherein said means to generate a first periodic signal comprises a square wave generator, and the outputs of said differential amplifier means and said square wave generator being coupled to the input of said means to integrate and the output of said means to integrate being coupled to the input of said comparator means.

8. Symmetry correction circuitry to balance the signals in at least two alternately switched switching devices comprising, means to individually monitor the signals in said switching devices, differential amplifier means responsive to said monitored signals to generate a signal proportional to the difference in signals conducted by the two switching devices, means to generate periodic signals comprising a triangular wave generator, means responsive to said difference signals for controlling the average signal level of said periodic signals, including an integrator, the output of said differential amplifier being coupled to the input of said integrator, signal summing means, the outputs of said integrator and said triangular wave generator being coupled to an input of said signal summing means, the signal output of said signal summing means comprising said periodic signal whose average signal level is responsive to said difference signal, comparator means coupled to the output of said signal summing means, said comparator means having an upper and lower threshold, said comparator means responding to said periodic signals by generating a drive signal when the periodic signals exceed said upper and lower thresholds, whereby the drive signal is utilized to control the switching off said two switching devices.

9. Symmetry correction circuitry as defined in claim 8 wherein said triangular wave generator comprises a second integrator, and a square wave generator having its output coupled to the input of said second integrator, the output of said second integrator being summed with the output of said first integrator.

* * * * *